April 1, 1947.　　　F. M. WETHERILL　　　2,418,439
FLUID MOTOR
Filed Dec. 20, 1943　　　2 Sheets-Sheet 2
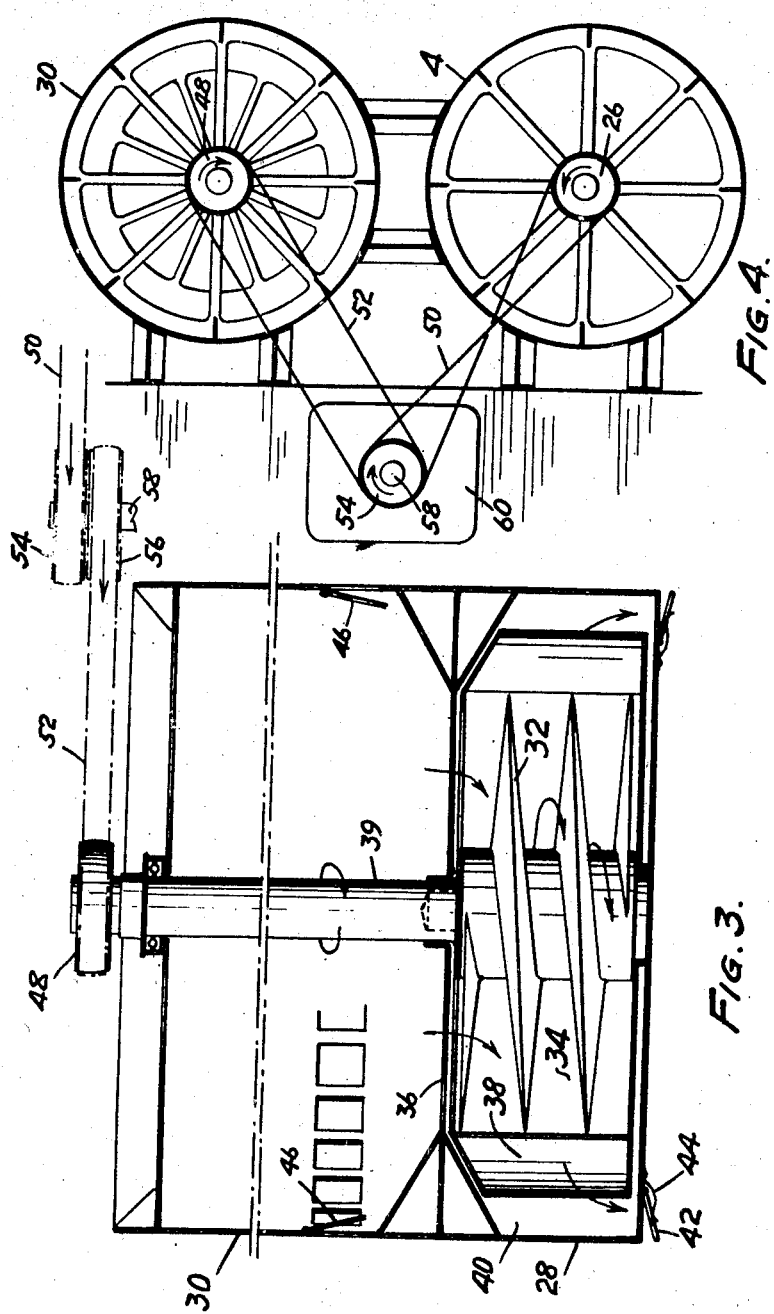
WITNESS:
INVENTOR
Francis M. Wetherill
BY
ATTORNEYS.

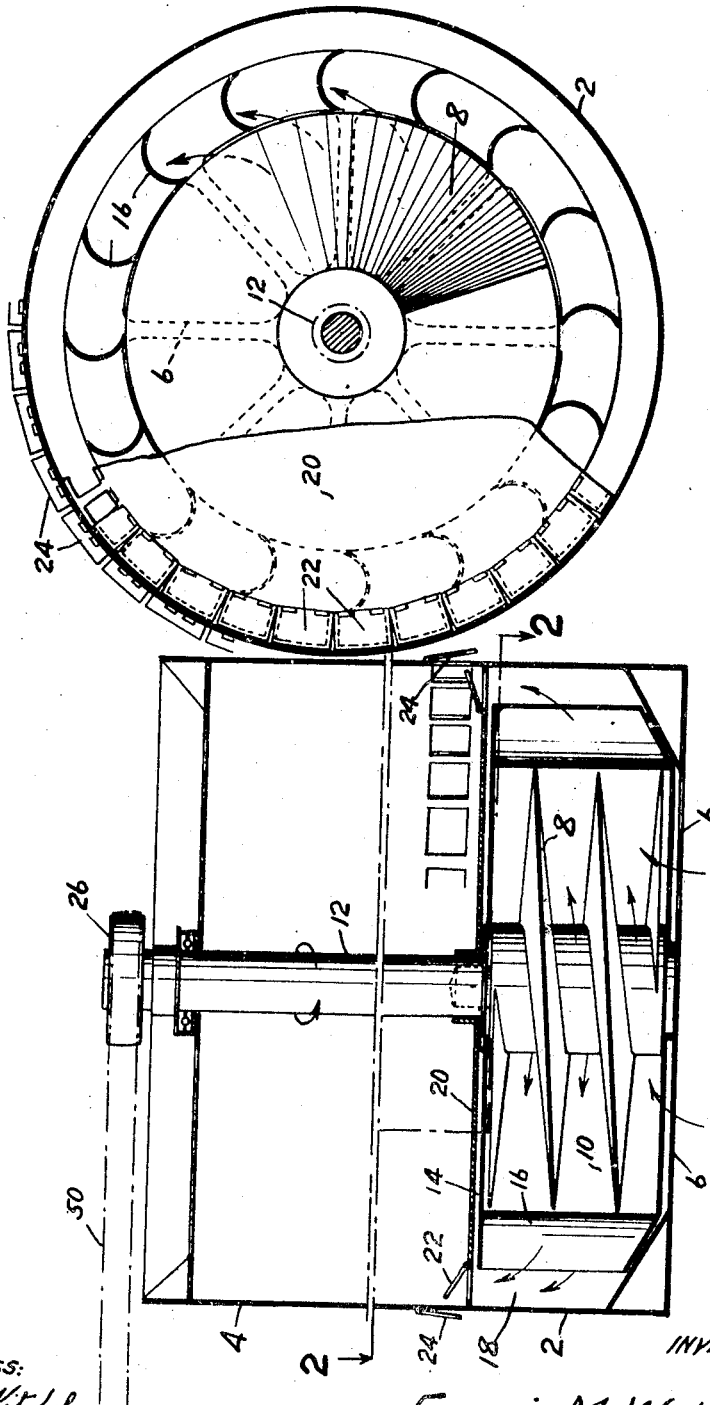

Patented Apr. 1, 1947

2,418,439

UNITED STATES PATENT OFFICE 2,418,439

FLUID MOTOR

Francis M. Wetherill, Philadelphia, Pa.

Application December 20, 1943, Serial No. 514,907

1 Claim. (Cl. 253—14)

This invention relates to a fluid motor, and has particular reference to a type adapted to convert to use the energy of waves or that which is, in general, available due to relative motion between a motor-carrying element and a liquid.

The broad object of the present invention involves the driving of a shaft by conversion of energy of the type indicated into rotation of a liquid capable of effecting the drive of a runner taking the form, for example, of a turbine wheel. Specifically, this is accomplished by producing a flow of liquid through a spiral passage whereby its energy is transformed into kinetic energy of rotation available for effecting a rotary drive.

A further object of the invention is to secure substantially continuous rotation by the utilization of a pair of motors having the same basic principle of operation but arranged to provide rotation by reason of opposite relative movements of a liquid and the motor or its support.

These, and other objects of the invention, particularly relating to details of construction and operation, will become apparent from the following description read in conjunction with the accompanying drawings, in which:

Figure 1 is a vertical section taken through a motor adapted to be driven by the rise of liquid relative thereto;

Figure 2 is a transverse section taken on the broken surface, the trace of which is indicated at 2—2 in Figure 1;

Figure 3 is an axial section similar to Figure 1, but showing a companion motor adapted to be driven by the fall of liquid relative thereto; and Figure 4 is a plan view showing the combination of said motors to effect drive of a common shaft.

Referring first, to Figures 1 and 2, the motor comprises a casing having lower and upper portions 2 and 4, respectively. The lower portion is open as indicated at 6 between structural webs and contains the stationary helix 8 in the form of a centrally supported helical plate or the like defining a helical passage 10. A rotary shaft mounted in suitable bearings in the casing supports through a disc 14 turbine vanes 16 curved in horizontal cross section as indicated in Figure 2. Outside the vanes 16 is an annular raceway 18 which communicates with the portion 4 of the casing through valves 22 adapted, when in lowered position, to close openings in a separating plate 20 which forms the boundary between the two portions of the casing. These vanes 22 are closed by gravity. The portion 4 of the chamber provides a stand pipe, the lower portion of which is provided with openings arranged to be controlled by valves 24 normally urged closed by gravity. The valves 22 and 24 form check valves for purposes which will be immediately made clear.

The shaft 12 is provided at its upper end with a pulley 26 for the transmission of power, though it will be evident that power may be transmitted in any other suitable way, as for example through gearing or the like.

In the operation of the motor of Figures 1 and 2 it may be assumed that it is located on a sea wall or in other suitable position with the bottom of the motor constantly submerged or, at any rate, not appreciably above the lowest level assumed by the troughs of waves. The stand pipe 4, on the other hand, should be of such height that under normal wave conditions its upper end will be above the highest point assumed by a wave crest.

Under such conditions, assume the approach of a wave producing a rise of water level at the exterior of the motor. As this level rises, the exterior level will be constantly above the level in the interior of the motor, and due to the external pressure, the valves 24 will be forced closed. As the water rises a head is produced which will caues an upward flow of water through the helical passage 10. In this flow, the water will be caused to rotate rapidly and as it reaches the vanes 16 of the turbine will enter the same to cause a rotation of the shaft 12 in a counter-clockwise direction. The water leaving the vanes, with a substantial portion of its kinetic energy of rotation absorbed, will pass into the annular region 18 and thence upwardly opening the check valves 22 and rising in the stand pipe 4. In this stand pipe, its level will not normally reach the level of the crest of the wave due to a time lag, but the maximum height reached will, nevertheless, be a substantial approach to the wave crest.

As the wave passes and the external level falls, as soon as the external level passes that inside the stand pipe, a reverse flow will tend to occur. Such flow, however, will be immediately arrested by the closed condition of the check valves 22, but now the valves 24 will open permitting the water to drain from the stand pipe 4. While the arrangement of the valves need not be tight, there will, in any event, be no such rapid downward flow of liquid through the vanes 16 and the helical passage 10 as would tend to produce either a braking action on the shaft or to rotate the shaft in the opposite direction.

Desirably used in conjunction with the motor of Figures 1 and 2 is a motor operating on similar principles such as indicated in Figure 3, but which is designed to drive its shaft as the exterior water level drops. This latter motor comprises a chamber 28 and a stand pipe 30. In the chamber 28 is located a fixed helical member 32 similar to the member 8 of Figure 1 and defining a similar helical passage 34. Downwardly flowing liquid may enter the helical passage 34 through openings 36 provided between the ribs of a structural member giving rigidity to the construction. Turbine vanes 38 also curved to receive rotary flow of liquid are supported by a shaft 39 which is mounted in suitable bearings. Surrounding the vanes 38 there is an annular passage 40, outlet from which is provided through ports controlled by check valves 42 which are normally urged upwardly to closed position by leaf springs 44.

The lower portion of the stand pipe is provided with openings controlled by check valves 46 which may be caused to close by the action of gravity and internal pressure. The shaft 39 carries a pulley 48 for the transmission of power.

In the operation of the last described motor external rise of water will be resisted by the closed valves 42 until the water rises above the level of the valves 46, whereupon it will flow into the stand pipe through the ports controlled thereby until it assumes a level in the stand pipe approximately corresponding to the exterior level. Under these circumstances little flow will occur into the helical passage 34 which may be substantially full of water, or, if empty, will merely be filled to the extent of its volume.

After the maximum level outside the motor is reached and the level drops, a head is produced which will cause downward flow of water from the stand pipe through the helical passage 34, the check valves 46 closing in view of this pressure head. As flow through the passage 34 takes place, rotation is imparted thereto, serving to drive the vanes 38 from which the water discharges into the annular space 40, leaving the same through the open valves 42. In this fashion, clockwise rotation is imparted to the shaft 39 as the water level falls.

It will be evident that a combination of the two motors may provide the application of substantially constant motion to a shaft suitably connected to the shafts 12 and 39. An arrangement of this type is illustrated in Figure 4, wherein belts 50 and 52 are arranged to impart to a shaft 58 the same sense of rotation through pulleys 54 and 56, the shaft 58 forming the drive shaft for a device 60 utilizing the power produced. This may, for example, comprise gearing and an electrical generator or may be a pump or the like for which the power is desired.

It will be evident that the operation of the motors, either of which may be used separately in the event that continuous application of power is not required, depends on the relative motion between the water and the motor.

It will be clear that variations in the specific embodiment of the invention may be made without departing from its scope as defined in the following claim.

What I claim is:

In combination, a shaft, an inflow and an outflow motor arranged to drive the shaft in the same direction, each motor being adapted to be operated by waves whereby frequent changes of liquid levels relative to the motors take place, each motor having a casing, there being an upper chamber and lower cylindrical chamber in each casing, means defining a helical passage in each lower chamber about the axis of said chamber open at its periphery, a runner arranged about each passageway to be driven by the liquid revolving in said passage during its progress therethrough, an annular passage surrounding the runner in each lower chamber, a partition between the chambers of the inflow motor, there being an inlet to the bottom of the lower chamber of said inflow motor, check valves in the partition between the two chambers opening from said annular passage and outwardly opening check valves from the upper chamber of the inflow motor, the lower chamber of the outflow motor having a closed bottom, a plurality of check valves opening into the upper chamber of its casing, an inlet from said upper chamber of the outflow motor to the helical passageway, and outwardly opening check valves in the bottom of the lower chamber opening outwardly from the passage surrounding the runner of the outflow motor.

FRANCIS M. WETHERILL.

REFERENCES CITED

The following references are of record in the file of this patent:

UNITED STATES PATENTS

| Number | Name | Date |
|---|---|---|
| 61,059 | Elmer | Jan. 8, 1867 |
| 696,982 | Lauten | Apr. 8, 1902 |